Dec. 9, 1924.
W. E. SHORE
1,519,012
CARBURATION CONTROL FOR INTERNAL COMBUSTION ENGINES
Filed May 9, 1919
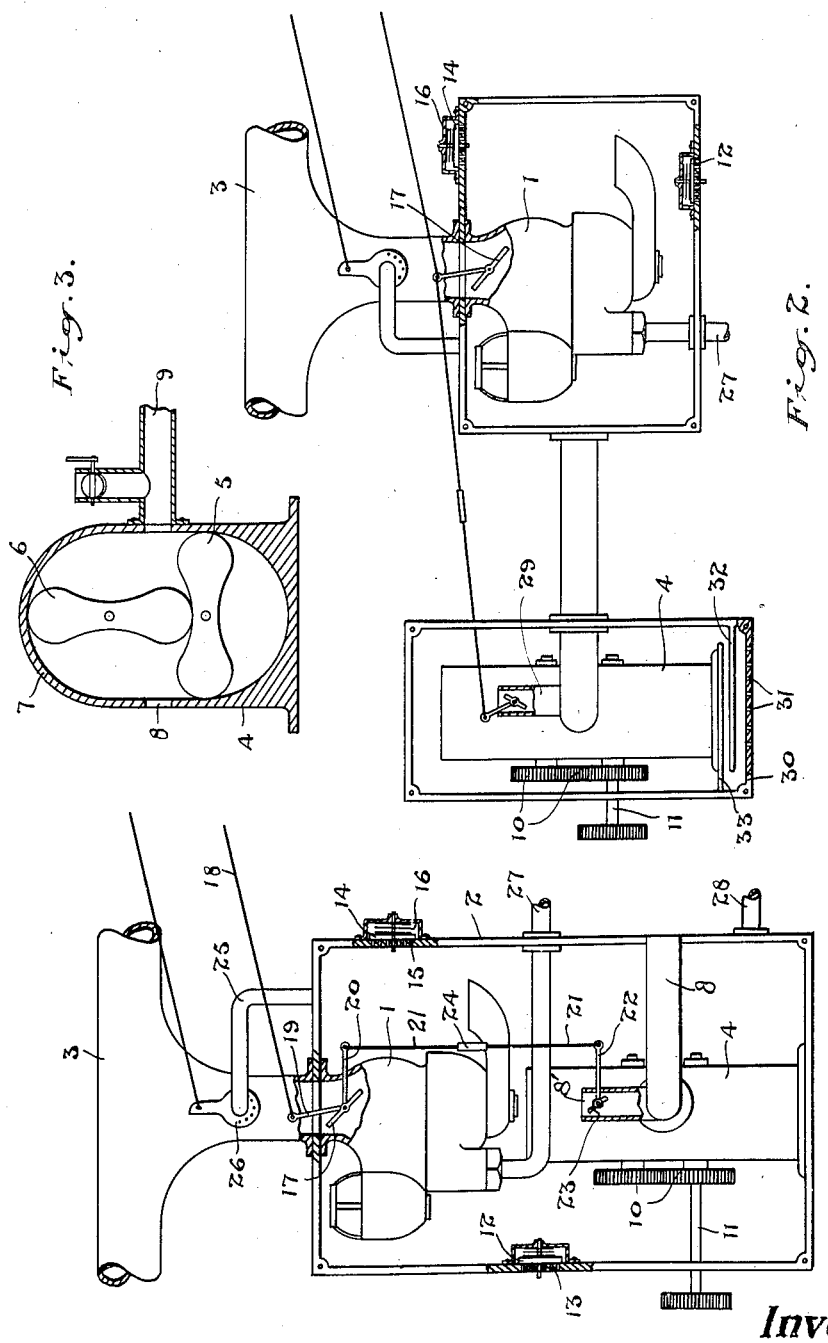
Inventor.
William E. Shore.
by H. J. S. Dennison atty.

Patented Dec. 9, 1924.

1,519,012

UNITED STATES PATENT OFFICE.

WILLIAM E. SHORE, OF NEW YORK, N. Y.

CARBURATION CONTROL FOR INTERNAL-COMBUSTION ENGINES.

Application filed May 9, 1919. Serial No. 295,993.

*To all whom it may concern:*

Be it known that I, WILLIAM E. SHORE, a subject of the King of Great Britain, and resident of the city of New York, in the State of New York, in the United States of America, have invented certain new and useful Improvements in a Carburation Control for Internal-Combustion Engines, as described in the following specification and illustrated in the accompanying drawings, that form part of the same.

The principal objects of this invention are, to maintain a constant and uniform pressure of air flow through the carburetor, thereby obtaining the maximum value of the fuel under varying atmospheric conditions and further to produce conditions which will ensure the maximum volume of gas in the engine cylinders at all speeds, thereby effecting an economy of fuel.

A further and important object is to enable the maintenance of high power conditions with a lean mixture thereby eliminating the accumulation of carbon.

A still further object is to eliminate many complicated carbureter structures and to provide an extremely simple unit which may be very accurately controlled and adjusted.

The principal feature of the invention consists in enclosing the carbureter within an air tight chamber and maintaining a pressure within said chamber greater than the suction pressure of the engine.

In the drawings, Figure 1 is an elevational view of my improved carbureter unit having the cover of the casing removed.

Figure 2 is an elevational view of a modified construction.

Figure 3 is a sectional detail view of the air pump.

It is well known to the art that many difficulties in the carburation of liquid fuel for internal combustion engines are due to varying conditions of atmospheric pressure, as well as to varying grades of fuel, in fact, the atmospheric conditions are much more important and many expensive and complicated carbureters have been devised in order to provide flexibility of adjustment to suit these changes of heavy and light atmosphere and recent development in aero propulsion has necessitated further development to provide for the different atmospheric conditions at different altitudes.

It is the purpose of this invention to dispense with many of the complications in present carbureter structures and to produce a uniformity of carburation conditions and this is accomplished in a very simple manner.

The carbureter 1 which may be of any desired type is enclosed within an air tight casing 2, the intake manifold 3 of the engine being directly connected to the casing at the outlet from the carbureter.

In the accompanying drawings I have shown arranged within the casing 2 enclosing the carbureter a small rotary air pump 4 of a very high speed type but this pump may be arranged within a separate casing and the two casings may be connected by a conduit, if so desired for convenience sake, according to the style of engine to which the device is to be applied.

The pump herein shown is of the double rotor type having the inter-meshing vanes 5 and 6 arranged within an elliptical-shaped case 7 enclosed within the casing 2 and the intake of the pump is through an opening 8 which extends beyond the casing 2.

The outlet 9 from the case 7 opens into the interior of the casing 2 completely filling the casing with air under pressure.

The vanes of the pump are connected by intermeshing gears 10 and the shaft 11 of one of the vanes extends beyond the casing, and is suitably geared to the engine shaft to operate at a speed of from 6000 to 8000 revolutions per minute.

An extremely small pump of this type will produce a compression within the carbureter casing sufficient to maintain a pressure within the casing against the suction of the engine, consequently there will always be a constant flow of air to the intake of the carbureter at a uniform pressure and also at a uniform temperature as the action of compression creates and maintains a uniform temperature.

This constant supply of air under pressure to the carbureter ensures the engine cylinders being at all times completely filled with an explosive mixture, as the pump will be designed to supply the maximum demand of the cylinders with the throttle of the carbureter wide open. This will of course very largely eliminate the possibility of back firing into the carbureter and as the flow is under pressure greater than atmosphere, upon the opening of the intake valves of the engine, the cylinder will be filled under pressure, a much leaner mixture may thus be used as a higher compression will be obtained and a saving of fuel will result.

In the event of the possibility of the engine vacuum exceeding the capacity of the pump it is necessary to provide an auxiliary air opening to the carbureter case and I have herein shown a valve 12 arranged upon the inner side of the casing 2 and closing a plurality of openings 13.

A relief valve 14 is also provided on the outer side of the casing 2, said valve normally closing the openings 15 and being held closed by the springs 16 against the pump pressure but in the event of the engine back firing through the carbureter the excess pressure will escape without bursting the casing.

The carbureter throttle 17 is controlled by the rod 18 connected to an arm 19 outside of the case.

An arm 20 is secured to the throttle spindle within the case and this arm is connected by a rod 21 to an arm 22 secured to the spindle of the throttle valve 23 arranged in a branch 8' in the intake pipe 8 which opens to the interior of the casing 2, the pipe 8 opening from the outside of said casing.

The rod 21 may be adjusted by means of a suitable turn buckle 24 to adjust the relation between the carbureter throttle 23 and the air pump throttle so that the discharge pressure from the air pump may be regulated by by-passing the pressure in the casing 2 back to the pump and the by-pass throttle being connected to the engine throttle it will thus be seen that the pressure within the carbureter casing will be regulated according to the speed of the engine.

It may be found desirable at very high speeds to augment the quantity of air in relation to the mixture and to accomplish this result I provide a by-pass 25 connected with the casing 2 and leading to the manifold 3. The flow of air through this by-pass is governed by a rotatable valve 26 which will be operated independently of the throttle.

Fuel is supplied to the carbureter through a pipe 27, the pressure in the gasoline tank being balanced with the pressure of the carbureter chamber by air carried through the pipe 28 leading from the casing 2.

In the event of the pump casing being separated from the carbureter casing the throttle control valve of the pump is arranged in a branch pipe 29 connected with the outlet and discharges into the interior of the pump casing with which the suction is connected as illustrated in Figure 3. In this arrangement when the throttle is opened wide the pump will be idling without exerting pressure in the carbureter casing as the pressure will be by-passed within the casing enclosing the pump and there will be no pressure against the pump as the intake opens directly into the casing. The bottom 30 of the casing has a plurality of small holes 31 therethrough and a muffler is formed by the arrangement of the baffles 32 and 33.

With an installation such as described uniform conditions of carburation may be maintained at varying altitudes by the control of the pump which of course may be operated independently from the throttle control if desired, though it is here shown connected directly with the throttle.

It will also be seen that if the pump is independently governed any excess of pressure in the carbureter chamber will be automatically taken care of by the relief valve 14. A method of carburation such as described will enable the use of much lower grade fuels than are at present found satisfactory as the constant pressure with velocity of flow will first atomize the heavier fuel and maintain it in suspension as the velocity may be maintained even when the engine is throttled down.

The design of pump herein shown is extremely simple and is capable of being run at very high speeds, will produce excellent results and retain its compressing value but it will be understood that other forms of pumps may be utilized.

What I claim as my invention is:—

In a carburation control, a carbureter arranged within a closed chamber, an air pump having its discharge connected with said closed chamber, a throttle controlling the carbureter, a throttle controlling the discharge from the air pump and means for simultaneously operating said throttles to regulate the flow of air to the chamber and maintain a constant pressure.

WILLIAM E. SHORE.